Oct. 9, 1923.

W. G. COX 1,470,000

FLEXIBLE BUMPER

Filed May 7, 1923

INVENTOR.
W. G. COX.
By Fisher Moser-Allock Attorneys

Oct. 9, 1923.                     W. G. COX                     1,470,000
                              FLEXIBLE BUMPER
                   Filed May 7, 1923          2 Sheets-Sheet 2
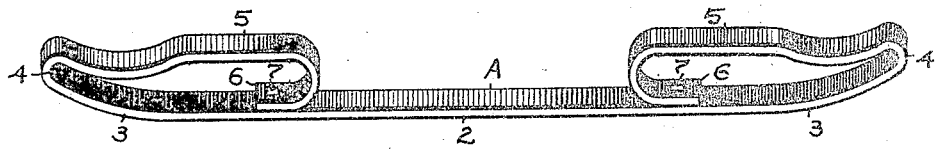
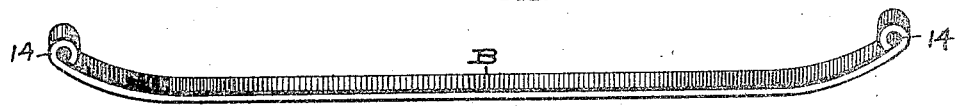
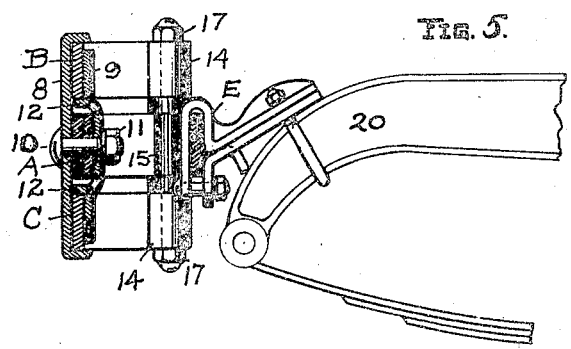
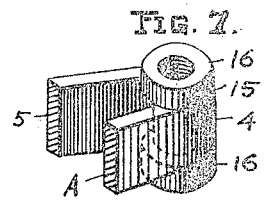
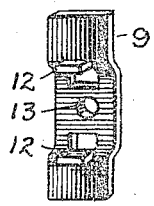
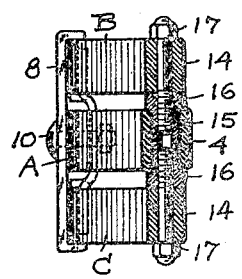
Inventor
W.G.COX.
By Fisher, Moser & Moore
                    Attorneys Patented Oct. 9, 1923.                                                  1,470,000

UNITED STATES PATENT OFFICE.

WILLIAM G. COX, OF CLEVELAND, OHIO, ASSIGNOR, BY MESNE ASSIGNMENTS, TO THE EATON AXLE AND SPRING COMPANY, OF CLEVELAND, OHIO, A CORPORATION OF OHIO.

FLEXIBLE BUMPER.

Application filed May 7, 1923. Serial No. 637,224.

*To all whom it may concern:*

Be it known that I, WILLIAM G. COX, a citizen of the United States, residing at Cleveland, in the county of Cuyahoga and State of Ohio, have invented certain new and useful Improvements in a Flexible Bumper, of which the following is a specification.

My main object is to provide a flexible bumper of suitable size and proportion for the larger and heavier types of automobiles in general use, and an effective bumper of that kind may be made by assembling and connecting three strips or bars of spring metal in substantially the way herein described and more particularly pointed out in the claims, and as delineated in the accompanying drawings, in which:

Figure 3 is a perspective view of the main fending bar, and Figure 4 a similar view of one of the supplemental fending rails.

Figure 5 is an enlarged side view of an end portion of an automobile frame and a vertical section of my improved bumper attached thereto.

Figure 6 is a vertical section on line 6—6 of Figure 1, showing one of the coupling devices for the rails or bars.

Figure 7 is a perspective view of a coupling member seated within the open bend at the reverted outer end of the main bar; and Figure 8 is a perspective of the coupling member itself.

Figure 9 is a perspective view of one of the clamping plates for the rails or bars.

Figure 1:
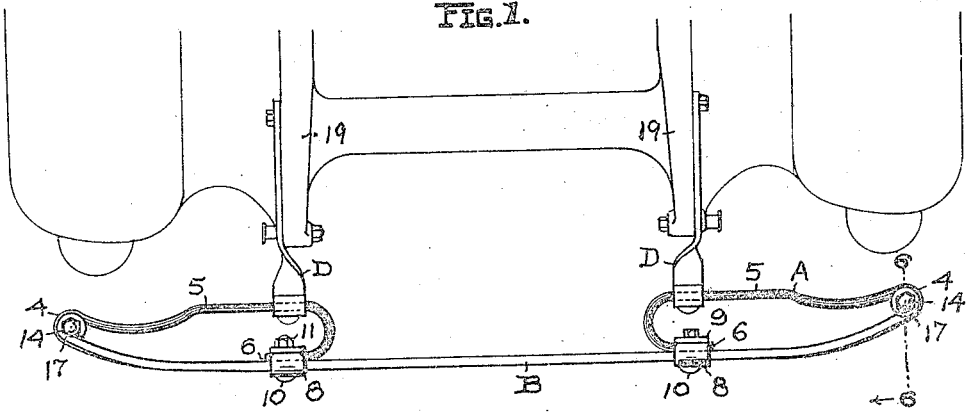
Figure 1 is a plan view of an end portion of an automobile equipped with my improved bumper.
Figure 2:
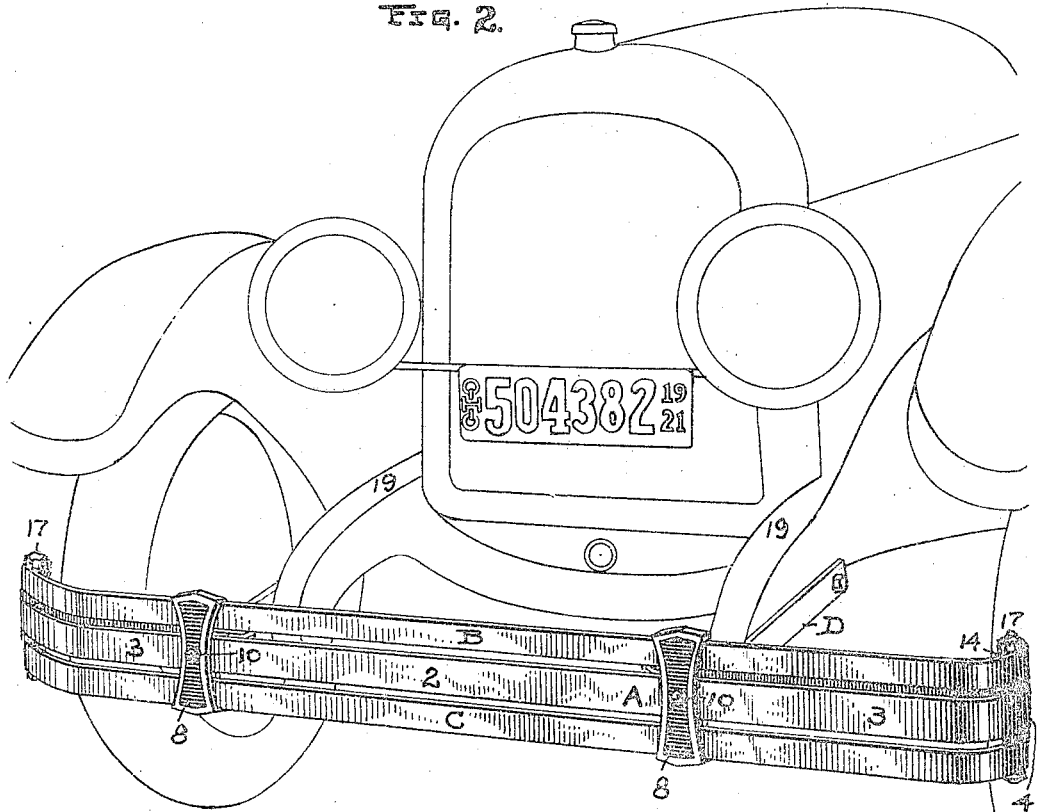
Figure 2 is a perspective view of the same parts.

The invention comprises a main striking and supporting bar A which may be made straight or curved for a major portion of its length and reverted or doubled back at its opposite ends to provide a single straight fending part 2 at its middle and doubled fending portions 3—3 at its opposite ends. Each end portion 3 has its reverted rear part curved on a different arc than its front part to narrow and taper the ends and to provide a relatively small round open bend 4 where the bar is reverted. The inner portion 5 of the reverted part is made straight and thence bent forwardly in a semi-circle to bring its flat extremity 6 against the rear face of fending part 2. Registering bolt openings 7 are provided where said parts meet and abut, and a pair of clamping plates 8 and 9, respectively, having similar bolt openings permit a clamping union to be effected between each extremity 6 and front portion 2, using bolts 10 and nuts 11 for that purpose, see Figure 5. In addition to clamping the said parts together, plates 8 and 9 also clamp two supplemental striking rails B and C, respectively, in parallel spaced position above and below bar A. To make such clamping and spacing fixed and effective the front plate 8 has its upper and lower ends flanged rearwardly to engage the top edge of supplementary rail B and the bottom edge of rail C, and rear plate 9 is provided between its ends with a pair of spaced lugs 12—12 struck up from the body of the plate and projected forwardly above and below a central bolt opening 13 to engage the edges of rails B and C opposite middle bar A. Rear clamping plate 9 is offset at its middle in respect to its flat clamping ends to permit spring clamping engagement to be made with the rear faces of upper and lower rails B and C which lie in the same vertical plane as bar A forwardly of flat extremity 6.

Upper and lower rails B and C are duplicates and correspond in shape and length to the front fending portions of supporting bar A, and each rail B and C is formed with closed eyes 14 at opposite ends thereof axially coincident with the rounded open bends 4 of bar A. A shouldered coupling sleeve or spool 15 is adapted to be inserted into the open side of the rounded ends 4 and to be snugly seated therein, the enlargements 16 at the top and bottom of the spool holding it from displacement vertically. Enlargements 16 also serve as spacing and seating members for the upper and lower rails, and separate bolts 17—17 pass through the end eyes 14 of said rails into screw-threaded engagement with spools 15, thereby locking the said rails securely at their ends to the reverted ends of bar A, see Fig. 6. Bar A is flexible in the greatest degree at its middle, and more rigid but still resilient at its doubled end 3—3. The upper and lower rails are flexible in substantially the same degree their full length, but when coupled to bar A as described the middle portion of the bumper is strengthened by their addition. The fending area is of the same width vertically throughout the length of the bumper, but the end portions are relatively stiffer and more resistant to blows than the middle portion because bar A is doubled back and connected at its extremities in braced union with itself at a substantial distance inwardly from its fending ends. The straight rear portions 5 are also extended inwardly a substantial distance from the ends to facilitate adjustable attachment to vehicle frames of different width by means of any suitable attachment device. For example in Figure 1, I show a pair of clamping arms or brackets D affixed to the outer faces of the side bars 19 of an automobile frame, and in Figure 5 I show a modified form of clamping bracket E seated upon and secured to the projecting spring hanger portion 20 of a frame. When the bumper is attached to the rear end of an automobile where a spare tire is mounted between the sides of the frame, the open space between the reverted portions 5 provides ample room for the reception of the tire opposite the bumper

What I claim is:

1. A flexible bumper for an automobile, comprising a main fender bar having reverted end portions secured at their extremities to the body of the bar, supplemental fender rails above and below said bar, and clamping devices uniting said bar and rails jointly together.

2. A flexible bumper for an automobile, comprising a main fender bar having reverted end portions terminating in forwardly bent extremities engaged with the rear face of the bar, fending rails above and below said bar, and means securing said extremities and said rails jointly to the bar.

3. A flexible bumper for an automobile, comprising a main fender bar having reverted elongated end portions at its rear terminating in bent extremities engaged with the body of the bar, parallel fending rails above and below said bar, and clamping devices embracing said extremities and the body of the bar and the said fending rails.

4. A flexible bumper for an automobile, comprising a main fender bar having reverted elongated end portions terminating in forwardly-extending extremities engaging the body of the bar, parallel fender rails above and below said bar and means connecting the ends of said rails to the reverted end portions of said bar.

5. A flexible bumper for an automobile, comprising a main fender bar having elongated reverted portions terminating in forwardly-extending extremities engaged with the body of the bar and formed with reduced outer bends, separate upper and lower fending rails having end eyes, and coupling members extending through said eyes and outer bends and uniting said rails and bar together.

6. A flexible bumper for an automobile, comprising a main fender bar having reverted end portions forming open bends therein, separate ending rails above and below said bar having eyes opposite said open bends, shouldered members seated within said open bends, and bolts extending through said rail eyes into screw connections with said members.

7. A flexible bumper for an automobile, comprising a main fender bar having reverted end portions forming open bends therein, separate fending rails paralleling said bar having end eyes, shouldered spools confined within said open ends, and bolts extending through said rail eyes into screw engagement with said spools.

8. A flexible bumper for an automobile, comprising a main fender bar, supplementary fending rails above and below said bar, and complementary clamping plates and bolts uniting said rails and bar together, one of said plates having spaced lugs struck up from the body thereof above and below its center adapted to seat the edges of the upper and lower rails and to space said rails apart from the main bar.

9. A flexible bumper for an automobile, comprising a main fender bar having elongated reverted end portions terminating in forwardly-extending extremities, the main body of the bar and said extremities having registering bolt openings, supplemental fending rails above and below said bar, clamping plates having spacing and holding projections for said rails and provided with bolt openings adapted to register with the bolt openings in the bar, and bolts extending through said openings having nuts adapted to clamp said parts detachably together.

In testimony whereof I affix my signature hereto.

WILLIAM G. COX.